April 16, 1974     N. J. BONGIOVANNI     3,804,956
METHOD OF PREPARATION OF PIZZA PRODUCT
Filed May 8, 1972
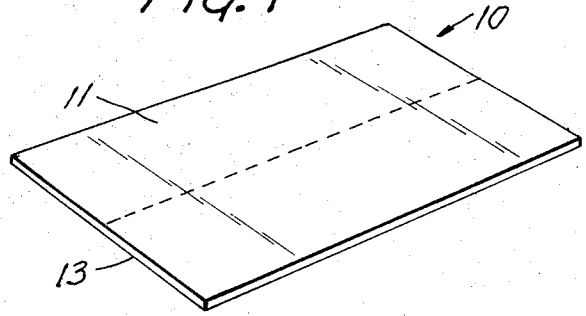
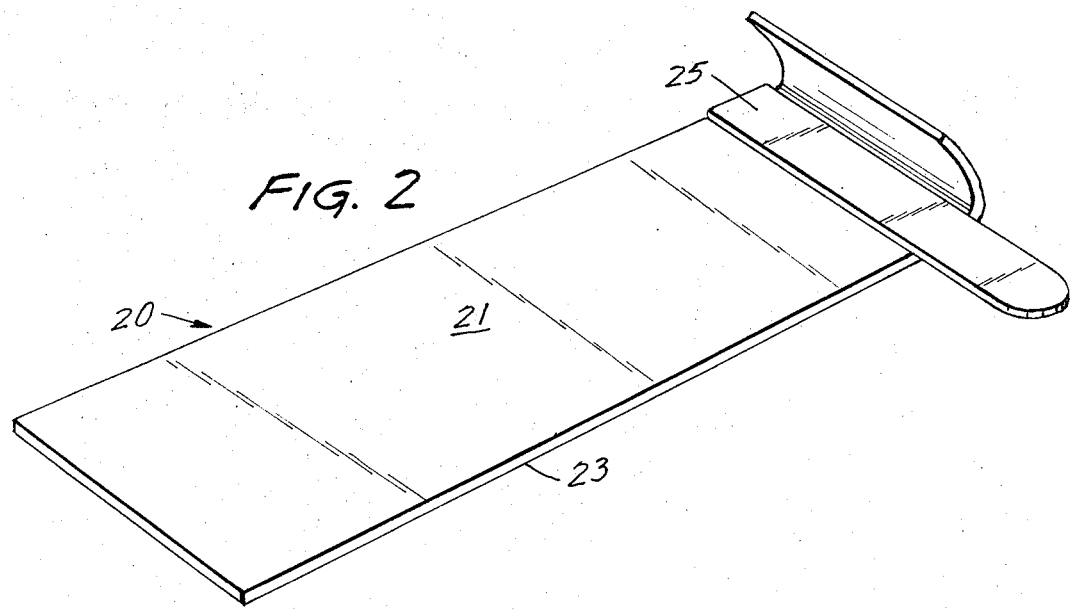
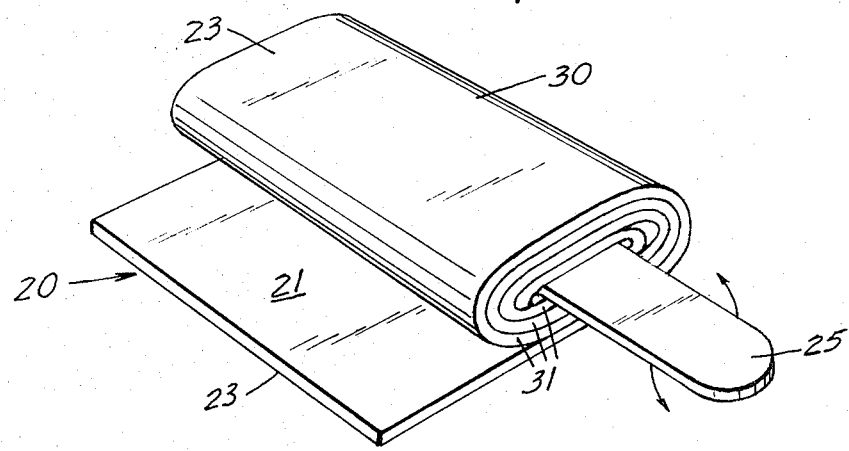

3,804,956
METHOD OF PREPARATION OF PIZZA PRODUCT
Nicholas J. Bongiovanni, Crystal, Minn., assignor to Wopo's Italian Frozen Food Products, Inc., Crystal, Minn.
Filed May 8, 1972, Ser. No. 251,153
Int. Cl. A21d 13/08
U.S. Cl. 426—344
4 Claims

ABSTRACT OF THE DISCLOSURE

A pizza product is prepared by wrapping a sauce covered pizza dough about a wooden support means and baking the thus formed pizza on the support means. The sauce adjacent the support bonds the pizza to the support which then serves as a handle during consumption of the pizza product.

FIELD OF THE INVENTION

This invention relates to food products. An aspect of this invention relates to convenience food products, e.g. frozen foods. A further aspect of this invention relates to pizza products and methods and means for making them convenient to eat. A still further aspect of this invention relates to a method for mounting a pizza on a stick and the product obtained thereby.

DESCRIPTION OF THE PRIOR ART

Many food products, such as confections, cooked meats (e.g. frankfurter), and ice cream or dairy products are mounted on a stick or other support or handle means for convenient eating. Such products can be quick frozen, packaged, and sold in food market freezers as convenience foods. It is also known to prepare convoluted sheet like food products, e.g. unbaked dough products, for similar freezing and packaging operations. Various other shapes and structures, such as sandwich-like composites, have been suggested to simplify food packaging, particularly for the convenience food market.

Mounting a pizza on a stick presents special problems. A sheet-like pizza cannot simply be impaled as a frankfurther or a solid confection can. One method is to deep fry the pizza in a batter so that the pizza will be held together and held to the stick. However, deep frying may alter the taste or other characteristics of the pizza so as to be unacceptable to those who prefer the traditional Italian style food products. Indeed, the typical convenience or quick frozen pizza product, if anything other than the traditional flat, sheet-like product, may be unacceptable to many pizza consumers.

Accordingly, this invention contemplates providing a sheet-like pizza mounted on a stick or similar handle or core, or support means, wherein the method of making and mounting the pizza does not alter the traditional Italian pizza taste.

BRIEF DESCRIPTION OF THE INVENTION

Briefly, this invention involves:

(a) providing a sheet-like, unbaked pizza in the traditional manner from dough and a layer of cheese, tomato paste, etc., but preferably with a rectangular periphery,
(b) placing a wooden handle means (normally about the size and shape of a physician's tongue depressor) near one side of the periphery of the pizza and on top of the layer of cheese and tomato paste,
(c) winding or rolling the unbaked pizza about the longitudinal axis of the wooden handle until several scroll-like convolutions of pizza are wrapped about the handle, the handle being tightly enclosed within the innermost convolution and jutting out beyond the body of the pizza to provide a convenient handling means,
(d) baking the resulting composite product at an ambient temperature of at least 200° F. (preferably 350–475° F.), until the wooden handle is heat bonded to the innermost convolution, and
(e) quick freezing or flash freezing the baked product for use in conventional frozen food packaging process.

Reheating the frozen product will make it suitable for eating. An especially good tasting product with a good heat bond between the wooden handle and the pizza is obtained by baking in an oven at 450° F. Surprisingly, there is little or no danger that the convoluted pizza will fall off the stick and the taste of a conventional sheet-like pizza product is obtained, but with a significant improvement in ease of preparation and eating for the pizza consumers. If an unfrozen product is desired, step (e) of the above described process can be omitted and the baked pizza can be eaten immediately.

The term "pizza" has a well-defined meaning in the food art, as is shown by the disclosure of U.S. Pat. 3,615,678 (Tangel, et al.), issued Oct. 26, 1971. The Tangel, et al., patent also illustrates a conventional pizza freezing process.

DESCRIPTION OF THE DRAWING

FIG. 1 is a perspective view of an unbaked pizza with a rectangular periphery;
FIG. 2 is a perspective of the pizza of FIG. 1, trimmed to size and arranged for rolling onto a support means;
FIG. 3 is a perspective view of the composite structure obtained by rolling the pizza of FIG. 2 onto the support means.

FIG. 1 illustrates the preferred configuration of an unbaked pizza used to make a pizza product of this invention. The unbaked pizza 10 of FIG. 1 has a rectangular periphery but is otherwise similar to a conventional unbaked pizza. Upper major surface 11 of pizza 10 is covered with a tomato paste and cheese mixture or any suitable modification thereof, and sliced sausage, anchovies, or the like can be added, if desired. The other major surface 13 of pizza 10 has the usual doughy or unbaked piecrust-like characteristics of unbaked pizza dough. A broken line parallel to the longest side of the rectangular periphery of pizza 10 indicates how pizza 10 can be cut in order to obtain long, narrow rectangular strips of pizza, particular adapted for rolling onto a support means.

In FIG. 2, one of these elongated pizza strips 20 is shown at the beginning of the rolling operation. Support means or handle 25 is an elongated wooden stick somewhat similar to a physician's tongue depressor. Support means 25 rests upon major surface 21, which corresponds to surface 11 of FIG. 1. That is, surface 21 is covered with the tomato paste and cheese mixture described previously. Surface 23 likewise corresponds to surface 13 of FIG. 1.

The rolling operation is apparent from FIGS. 2 and 3. Support means 25 can be rotated about its longitudinal axis while the pizza strip 20 is rolled up like a scroll around it. The result is the convoluted sheet-like product mounted on a stick as shown in FIG. 3 to further illustrate the rolling operation. Approximately one-half turn of the support means 25 remains to be completed before the composite structure of FIG. 3 is ready for baking.

As can be seen from FIG. 3, this composite product comprises means 25 closed within the innermost convolution of a series of convolutions 31, support means 25 is in contact with the tomato paste and chesse mixture of surface 21. Strip 20 when completely rolled up on support means 25 forms a substantially cylindrical shape 30 and outer doughy surface 23.

Support means 25 is preferably a wooden handle or stick. It is theorized that, during the baking operation at about 450° F. oven temperature, wood of handle 25 comes adhesively bonded to the tomato paste and cheese mixture of surface 21 an innermost convolution of the series of convolutions 31. Apparently, the aforementioned mixture partially penetrates the surface of the wood and support means during heating, forming a firmly adherent bond. The heat bonding step in no way detracts from the taste of the pizza.

It will be apparent from FIG. 3 that it is preferred to have at least three convolutions 31 wrapped about support means 25. It can also be seen why the elongated strip 20 is the preferred configuration for the unbaked pizza, which is wrapped on support means 25, but, of course, unbaked pizzas with square, oval, or even circular peripheries could be used in this invention.

Other specification of the method of this invention and the product obtained from the method will occur to the skilled artisan.

What is claimed is:

1. A method for preparing a convenience food product comprising the steps of:
   (a) providing a sheet-like unbaked pizza dough having first and second major surfaces generally the same in area, said first major surface being at least partially covered by a tomato-based sauce;
   (b) placing an elongated rigid wooden support means on said first major surface with part of the length of one of its longer sides generally adjacent to one side of the periphery of said sheet-like unbaked pizza;
   (c) winding said sheet-like unbaked pizza about the longitudinal axis of said support means, using said support means as a core for said winding until a plurality of convolutions wound about said support means has been obtained and said support means is enclosed along part of its length within the innermost of said convolutions, said second major surface being the outer surface of said convolutions,
   (d) baking the resulting convoluted sheet-like pizza at an ambient temperature above 200° F. at least until said support means is heat bonded to the sauce on said inner surface of said innermost convolution.

2. A method according to claim 1 wherein said support means is a wooden stick.

3. A method according to claim 1 wherein said temperature is 450° F.

4. A method according to claim 1 comprising the additional step of freezing the product produced by step (d).

References Cited
UNITED STATES PATENTS

| | | | |
|---|---|---|---|
| 1,706,491 | 7/1927 | Jenkins | 99—107 XR |
| 3,532,510 | 10/1970 | Zimmerman | 99—86 |

RAYMOND N. JONES, Primary Examiner

J. R. HOFFMAN, Assistant Examiner

U.S. Cl. X.R.

426—134; DI—22